Jan. 22, 1929.

G. W. HARLAN

RAIL JOINT FASTENER

Filed May 12, 1928

INVENTOR
G. W. Harlan,
BY
ATTORNEY

Patented Jan. 22, 1929.

1,700,046

UNITED STATES PATENT OFFICE.

GEORGE W. HARLAN, OF OTTERVILLE, MISSOURI.

RAIL-JOINT FASTENER.

Application filed May 12, 1928. Serial No. 277,174.

This invention relates to improvements in rail joint fasteners, and it consists of the constructions, combinations and arrangements herein described and claimed.

An object of the invention is to provide a safe, simple and reliable rail joint fastener, which affords facilities for securely connecting the end portions of two aligned rails and for holding such portions particularly against sagging, twisting or other relative motions.

Another object of the invention is to provide a fastener which has a resilient quality, the especial virtues of which are the requirement of a special tool to apply the fastener, and the firm holding of the abutting rails under tension so that all looseness and rattling are avoided.

A further object of the invention is to provide a joint fastener which will serve as a guard for the electrical bond wires usually incorporated in rail joints.

Figure 1:
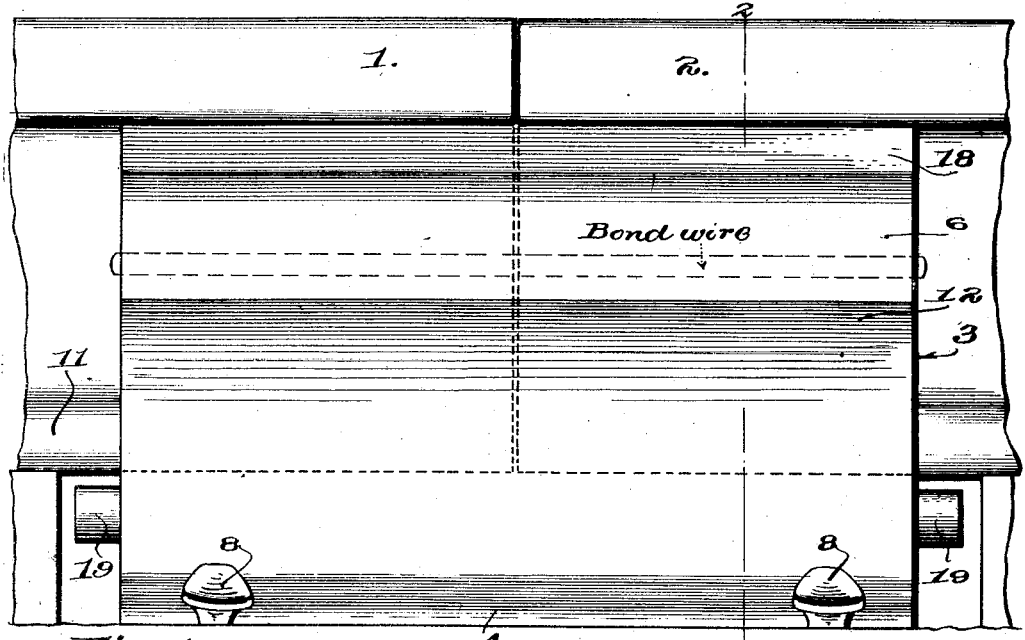
Figure 2:
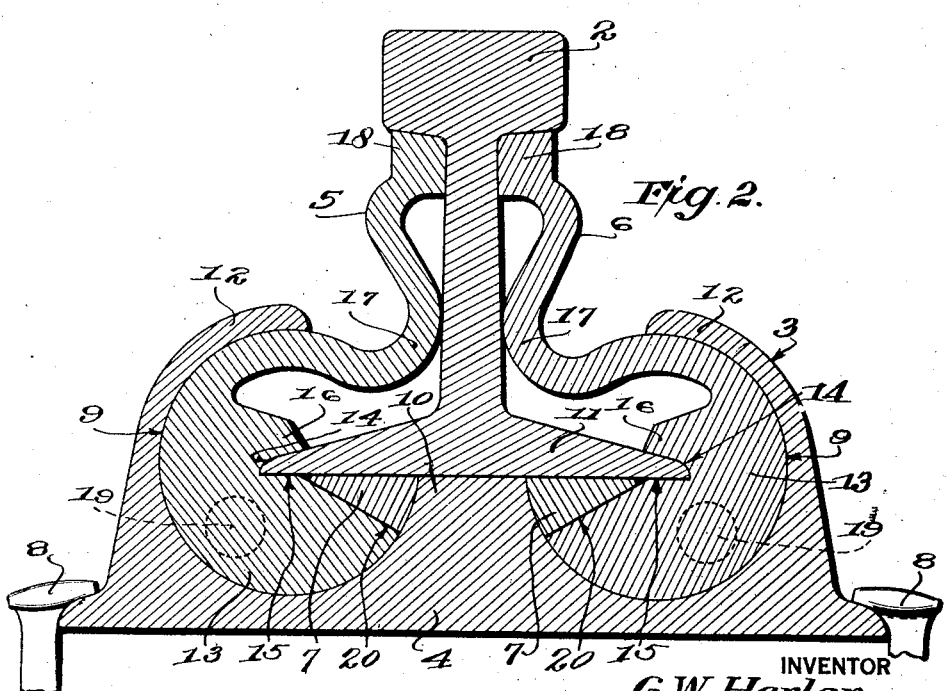

Other objects and advantages appear in the following specification, reference being had to the accompanying drawing in which, Figure 1 is a side elevation showing the improved fastener at the joint between abutting rails, Figure 2 is a cross section taken on the line 2—2 of Figure 1.

One of the most persistent problems in laying down the rails of a track is to so connect the ends of abutting rails that the joint will not sag and that there will be no relative twisting or other motion between rails. Many devices have been developed and tried for the accomplishment of the purpose, but it appears that in the majority of instances the well known fish plate is faithfully adhered to.

The loosening of nuts and breaking of connecting bolts defeats the purpose of the fish plate many times so that many of the fundamental purposes of a rail joint become defeated. The fastener herein disclosed will eliminate the fish plate, and at the same time establish a joint several times stronger.

It is important to observe that neither bolts nor nuts are employed in this fastener so that the danger of breaking the first or losing the latter is eliminated entirely.

Reference is made to the drawing. Abutting rails are indicated at 1 and 2. The fastener, generally designated 3, comprises a base 4 and a pair of clamps 5 and 6. Wedges 7 are parts of the fastener combination. The base 4 is intended to rest upon a tie which should be present at the rail joint. The base will be spiked down as at 8.

The provision of a pair of cylindrical grooves 9 which are approximately three-fourths of a circle in extent, provides a central ridge 10 which serves in part as an abutment for the wedges 7, and a rest for the base 11 of the rails 1 and 2. The grooves are defined in part by the cylindrical flanges 12 that curve upwardly and over toward the center of the base. The extent of the grooves 9 over three-fourths of a circle, as already stated, leaves entrances at which the pair of clamps are introduced.

The latter are of a peculiar formation. They comprise rounded bottoms 13 which fit the grooves 9 and are capable of limited rotation therein. The bottoms are notched at 14 to receive the outer edges of the rail base. These notches are in transverse alignment, the floors 15 being in line with the ridge 10. The rail base will rest on the ridge and floors.

The formation of the notches leaves projections 16 which fit the upper part of the rail base at its outer edges and aid the clamps in preventing any tendency of the rail joint to turn or twist. The exposed extensions of the clamps are corrugated as at 17. These corrugations have a limited amount of resiliency. They are capable of being compressed by a special tool, so that when the clamps are finally fitted into position they will hold the abutting ends of the rails under tension to prevent looseness and rattling.

For the latter purposes the corrugated extensions terminate in heads 18 which fit in the shoulders formed by the rail head and web. The inward bowed portions of the corrugations may bear against the rail web thus to make sure of the holding function. The rounded bottoms have end projections 19 upon which an upward pressure is brought to bear when working the clamps into position.

It is to be noted that the bottoms 13 are appropriately cut away at 20 to make room for the wedges 7. The wedges when hammered into position, will bear against the cut away portions 20, the sides of the central ridge 10 and the bottom of the rail base 11.

The operation is readily understood. First consider the clamps 5 and 6 and wedges 7 as being removed. The rails 1 and 2 are fitted together in the proper abutting position. The base 4 will be held slantingly in a position parallel to the rails, and slipped under the rail base until the latter rests upon the central ridge 10. The clamps 5 and 6 are then slipped into the grooves 9. The notches 14 will fit over the outer edges of the rail base.

A special tool must now be put to use to compress the corrugated extensions 17 of the clamps until the heads 18 engage the shoulders of the rail head. Ordinarily the outer edges of the rail base will fit loosely in the notches 14, thus allowing a limited turning movement of the rounded bottoms 13 in the cylindrical grooves 9. The end projections 19 will be gripped so that the rounded bottoms 13 may be turned upward toward the rail. Any lift in the outward and upward direction will tend to facilitate the compression of the clamps 5 and 6.

When the compression function is ended it will be found that the recession of the cut away portions 20 from the end surface of the rail base has left liberal openings for the introduction of the wedges 7. The latter are now driven into place, thus locking the two compressed clamps in position. The rail ends will be held in perfect alignment as though in a powerful vise.

It will usually be preferable to make the wedges 7 in pairs on each side so that wedges can be driven in from opposite ends on each side. A balanced support will thus be afforded. It is an important consideration to shield the electrical bond wires which are customarily seen at rail joints. These wires, of which one is indicated in Figure 1, will be run through or under the corrugated extensions 17. The spring clamps thus serve as guards for the bond wires, preventing access thereto both by persons of evil intentions and by the elements.

The manner in which the fastener is applied to the rails causes a powerful tension on all of the parts concerned. The joint will therefore be as noiseless as any other section of the rail.

While the construction and arrangement of the improved rail joint fastener is that of a generally preferred form, obviously modifications and changes may be made without departing from the spirit of the invention or the scope of the claims.

I claim:—

1. A fastener comprising a base to receive the abutting ends of a pair of rails, a resilient clamp, and means by which the clamp is fitted in the base for limited turning, facilitating compression of the clamp and to cause bearing thereof against portions of the rails.

2. A fastener comprising a base to receive the abutting ends of a pair of rails, clamps fitted in the base and bearing against portions of the rails, and wedges driven in position between portions of the base, clamps and rail base.

3. A fastener comprising a base receiving a rail and having a cylindrical groove adjacent to a flange of the rail, a clamp having a cylindrical bottom seated in the groove and having a resilient extension reaching over said flange to a point of termination adjacent to the head of the rail and being capable of compression, and a head at said point of termination, engaging with the head when the extension is compressed.

4. A fastener comprising a base receiving the abutting ends of a pair of rails and having grooves, clamps having bottoms seated in the grooves and having resilient extensions capable of compression, and heads at which said extensions terminate, engaging with the shoulders between the heads and webs of the rails when the extensions are compressed, and wedges driven between said base, the bottoms of the clamps and the base of the rails.

5. A fastener comprising a base having grooves defining a ridge upon which the bases of abutting rails may rest, clamps having bottoms occupying the grooves and having notches in alignment with the ridge to receive the outer edges of the rail bases, corrugated extensions of the bottoms having heads to engage and hold under tension portions of the rails when said extensions are compressed, and wedges driven into the grooves between the rail bases, clamp bottoms and ridge.

6. A fastener comprising a base having cylindrical grooves defining a ridge for the support of abutting rails, resilient clamps having rounded bottoms received by the grooves, being capable of limited turning in the grooves when the clamps are compressed, and heads on the clamps then engaging shoulders defined by the webs and heads of said rails.

7. A fastener comprising a base having cylindrical grooves defining a ridge for the support of abutting rails, resilient clamps having rounded bottoms received by the grooves, being capable of limited turning in the grooves when the clamps are compressed, heads on the clamps then engaging shoulders defined by the webs and heads of said rails, and wedges driven between the ridge, rail bases and rounded bottoms to hold the latter in position.

8. A fastener comprising a base having cylindrical grooves defining a ridge for the support of abutting rails, resilient clamps having rounded bottoms received by the grooves, being capable of limited turning in the grooves when the clamps are compressed, heads on the clamps then engaging shoulders defined by the webs and heads of said rails, and projections on the ends of the bottoms facilitating the turning of the bottoms when compressing the clamps.

9. A rail joint fastener comprising a base having a pair of cylindrical grooves defining a pair of circular flanges and a central ridge serving as a rest for abutting rails and a wedge abutment, a pair of clamps of corrugated formation to impart resiliency, having rounded bottoms fitting in the grooves, being notched to receive the outer edges of the rail bases and cut away at points adjoining the ridge, heads on the clamps engaging the rails when the clamps are compressed, and wedges driven into abutting positions with the ridge, cut away portions and rail bases to hold the rounded bottoms in position.

10. A fastener comprising a base, and a resilient clamp rockably mounted upon the base and bearing against a part of a rail rested upon the base.

Signed at Otterville in the county of Cooper and State of Missouri this 9th day of May, A. D. 1928.

GEORGE W. HARLAN.